United States Patent [19]

Gallagher et al.

[11] Patent Number: 5,580,501
[45] Date of Patent: Dec. 3, 1996

[54] METHOD OF MANUFACTURING AN INTERIOR TRIM PANEL USING POLYURETHANE POWDER

[76] Inventors: Michael J. Gallagher, 325 Winnacunnet Rd., Hampton, N.H. 03842; William Humphrey, 61 Tuttle La., Dover, N.H. 03820; Wayne C. Salisbury, Kings Hwy., Middleton, N.H. 03887; David W. Syphers, R.R. #1 Box 58, Farmington, N.H. 03835

[21] Appl. No.: 335,042

[22] Filed: Nov. 7, 1994

[51] Int. Cl.⁶ .......................... B29C 44/06; B29C 44/12
[52] U.S. Cl. .................. 264/45.3; 264/45.4; 264/45.5; 264/46.4; 264/46.6; 264/126; 264/255; 264/257; 264/302; 264/308
[58] Field of Search .................... 264/302, 255, 264/257, 46.4, 46.6, 45.5, 45.4, 126, 308, 45.3

[56] References Cited

U.S. PATENT DOCUMENTS

| | | | |
|---|---|---|---|
| 3,708,179 | 1/1973 | Hulten | 280/150 |
| 3,954,926 | 5/1976 | Pahl et al. | 264/46.4 |
| 4,110,139 | 8/1978 | Mashida et al. | 264/255 |
| 4,294,880 | 10/1981 | Nishida | 264/255 |
| 4,455,340 | 6/1984 | Okina | 264/46.6 |
| 4,664,864 | 5/1987 | Wersosky | 264/301 |
| 4,769,278 | 9/1988 | Kamimura et al. | 428/428 |
| 4,891,081 | 1/1990 | Takahashi et al. | 156/78 |
| 4,893,397 | 1/1990 | Hughes | 29/428 |
| 4,900,489 | 2/1990 | Nagase et al. | 264/46.5 |
| 4,940,558 | 7/1990 | Jarboe et al. | 264/46.7 |
| 5,017,115 | 5/1991 | Yanagishita et al. | 425/125 |
| 5,037,591 | 8/1991 | Rohrlach et al. | 264/46.5 |
| 5,073,318 | 12/1991 | Rohrlach et al. | 264/46.5 |
| 5,096,639 | 5/1992 | Hughes | 264/46.5 |
| 5,114,980 | 5/1992 | Lii et al. | 521/51 |
| 5,161,819 | 11/1992 | Rhodes, Jr. | 280/728 |
| 5,173,226 | 12/1992 | Cazaillon et al. | 264/46.6 |

FOREIGN PATENT DOCUMENTS

| | | | |
|---|---|---|---|
| 62-253417 | 11/1987 | Japan | 264/302 |
| 64-26413 | 1/1989 | Japan | 264/302 |
| 2184411 | 7/1990 | Japan | 264/302 |
| 8403251 | 8/1984 | WIPO | 264/255 |
| 9323237 | 11/1993 | WIPO | 264/255 |

Primary Examiner—Allan R. Kuhns

[57] ABSTRACT

An interior trim panel comprises a flexible polyurethane skin layer, an intermediate resilient polyurethane foam layer and a rigid polyurethane foam substrate. The flexible polyurethane skin layer and intermediate resilient polyurethane foam layer are formed as an expanded thermoplastic urethane (TPU) shell in a slush molding process. The rigid polyurethane foam substrate is then foamed in place on the shell in a substrate forming mold. This produces an environmentally friendly, long lasting interior trim panel that can be manufactured economically without any need for plasticizers or adhesive coatings.

18 Claims, 1 Drawing Sheet

METHOD OF MANUFACTURING AN INTERIOR TRIM PANEL USING POLYURETHANE POWDER

BACKGROUND OF THE INVENTION

This invention relates generally to interior trim panels for automobiles and more particularly to automotive interior trim panels that have a flexible plastic covering attached to a structural substrate.

U.S. Pat. No. 4,900,989 granted to Takashi Nagase and Yoshio Taguchi Feb. 13, 1990 discloses an automotive trim panel that comprises an expanded polyvinyl chloride skin that is made by a double slush molding process to produce a thin skin of about 0.1 mm to 0.5 mm thickness with a thin foam backing of about 0.4 to 3.0 mm thickness. The expanded polyvinyl chloride skin or covering is then placed in a foaming mold and integrated with a steel core plate by foaming an intermediate flexible polyurethane layer in place.

According to the patent, the use of an expanded polyvinyl chloride skin eliminates or substantially reduces the migration of plasticizer in the polyvinyl chloride to the polyurethane layer and thus avoids degradation, cracking and discoloration of the polyvinyl chloride skin.

This proposal, however, does not solve the underlying problem inherent in the use of a polyvinyl chloride skin which is not environmentally friendly because of the need for a plasticizer to achieve low temperature flexibility. Another environmental concern, particularly in Europe, is the possible escape of chlorine and consequent damage to the ozone layer. Another drawback of the proposal is that the polyvinyl chloride foam does not adhere well to the intermediate polyurethane layer and consequently it is often necessary to apply a urethane coating to the polyvinyl chloride foam backing before the polyurethane layer is foamed in the foaming mold.

Another known method that is similar to the above method foams a rigid polyurethane foam in place after the expanded polyvinyl chloride skin is placed in the foaming mold. This eliminates the need for a steel core plate. However this known method has the same problems and drawbacks discussed above in connection with the expanded polyvinyl chloride skin.

U.S. Pat. No. 4,769,278 granted to Tomobisa Kamaimura, Noriyoshi Suzuki, and Takashi Imaizumi Sep. 6, 1988 also discloses methods of manufacturing interior trim panels using a double slush molding process. For instance in the "prior art" method of FIG. 5 the expanded vinyl skin is still slush molded. However, a preformed rigid core is set against the vinyl foam backing layer while it is still soft to join onto the expanded vinyl skin. According to the patent this method has several problems including difficulty in forming the vinyl skin layer evenly, difficulty in controlling the thickness of the vinyl foam layer and the formation of pockets of air between the vinyl foam layer and the rigid urethane core.

The patent then considers and rejects the concept of forming a rigid urethane core by pouring hard urethane resin onto the vinyl foam layer for several reasons.

The patent then proposes as a solution, the bonding of a preformed laminated substrate comprising a rigid core having a resilient urethane foam or felt covering to the vinyl foam layer of the expanded vinyl skin after the vinyl foam layer cures. This patented solution, however, has the same problems and drawbacks discussed in connection with the earlier patent. Moreover, the method is more complicated and more expensive.

U.S. Pat. No. 5,073,318 granted to Milo L. Rohrlach and William J. Hall Dec. 17, 1991 discloses a door inner panel of a motor vehicle comprising a substrate of rigid polyurethane foam reinforced with glass fibers, an elastomeric facing layer of flexible polyurethane, and an intermediate layer of soft resilient polyurethane foam between the facing layer and the substrate which extends sufficiently over the area of the panel to adhere the facing layer to the substrate. The patent specification does not mention any particular advantages for the preferred polyurethane materials and suggests using other alternative materials. For instance, reinforced polyesters, wood dust filled polypropylene or phenolic bonded fabric fibers are indicated as suitable for the substrate while flexible acrylic, polyvinylchloride and other polymeric materials are mentioned for the facing layer.

The door inner panel is made in stages in which the rigid reinforced substrate is molded in a first die set. The molded substrate is then positioned in an upper die part of a second die set. The lower die part of the second die set is sprayed with a paint and then a second layer of polyurethane elastomer is applied curing to a dense soft polyurethane facing layer. After the facing layer has at least partly cured, foam forming material is placed over the facing layer and the die parts of the second die set are closed. The foam forming material then cross links into a soft resilient polyurethane foam that adheres to the facing layer and the substrate over most of the area of the panel.

The Rohrlach method like that of the Kamaimira patent discussed above is also complicated and expensive.

SUMMARY OF THE INVENTION

The object of this invention is to provide an economical method of making an interior trim panel comprising an expanded thermoplastic covering skin and a rigid plastic substrate that are made of environmentally friendly materials such as polyurethane that do not require plasticizers or contain chlorine.

Another object of this invention is to provide a method of making an interior trim panel comprising an expanded thermoplastic polyurethane skin or shell and a rigid polyurethane substrate that is economical.

A feature, advantage and object of this invention is that it provides an interior trim panel comprising an expanded thermoplastic skin and a rigid substrate that does not require application of an adhesive or bonding layer on the foam backing of the expanded thermoplastic covering for securely attaching the rigid substrate.

Another feature, advantage and object of this invention is that it provides an interior trim panel comprising an expanded thermoplastic skin that is environmentally friendly and a rigid substrate that is formed in place and adheres to the expanded thermoplastic skin without any need for applying a bonding layer to the expanded thermoplastic skin prior to forming the rigid substrate.

Yet another feature, advantage and object of the invention is that it takes full advantage of the slush molding process for economical manufacture.

Still yet another feature, advantage and object of the invention is that it takes full advantage of forming the substrate in place for economical manufacture.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
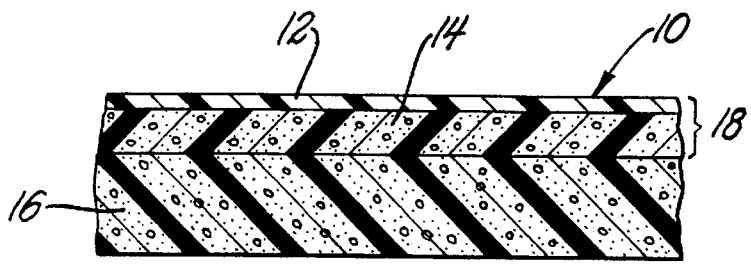
FIG. 1 is a fragmentary cross section of an interior trim panel made in accordance with the invention.

Referring now to the drawing an interior trim panel 10 that is made in accordance with this invention comprises a skin or facing layer 12 of flexible polyurethane, an intermediate layer 14 of soft resilient polyurethane foam and a substrate 16 of relatively rigid polyurethane.

The flexible polyurethane skin or facing layer 12 is preferably an aliphatic thermoplastic urethane but may be any suitable aliphatic or aromatic thermoplastic polyurethane. These materials retain their flexibility at low temperature and consequently the skin layer 12 does not crack or discolor in use resulting in an interior trim panel 10 of long life. Moreover these materials retain their flexibility without any need for plasticizers so that the interior trim panel is environmentally friendly. Another advantage is that these materials do not include any ingredient such as chlorine that is harmful to the environment in the event that it escapes or leaches out of the skin.

Figure 2:
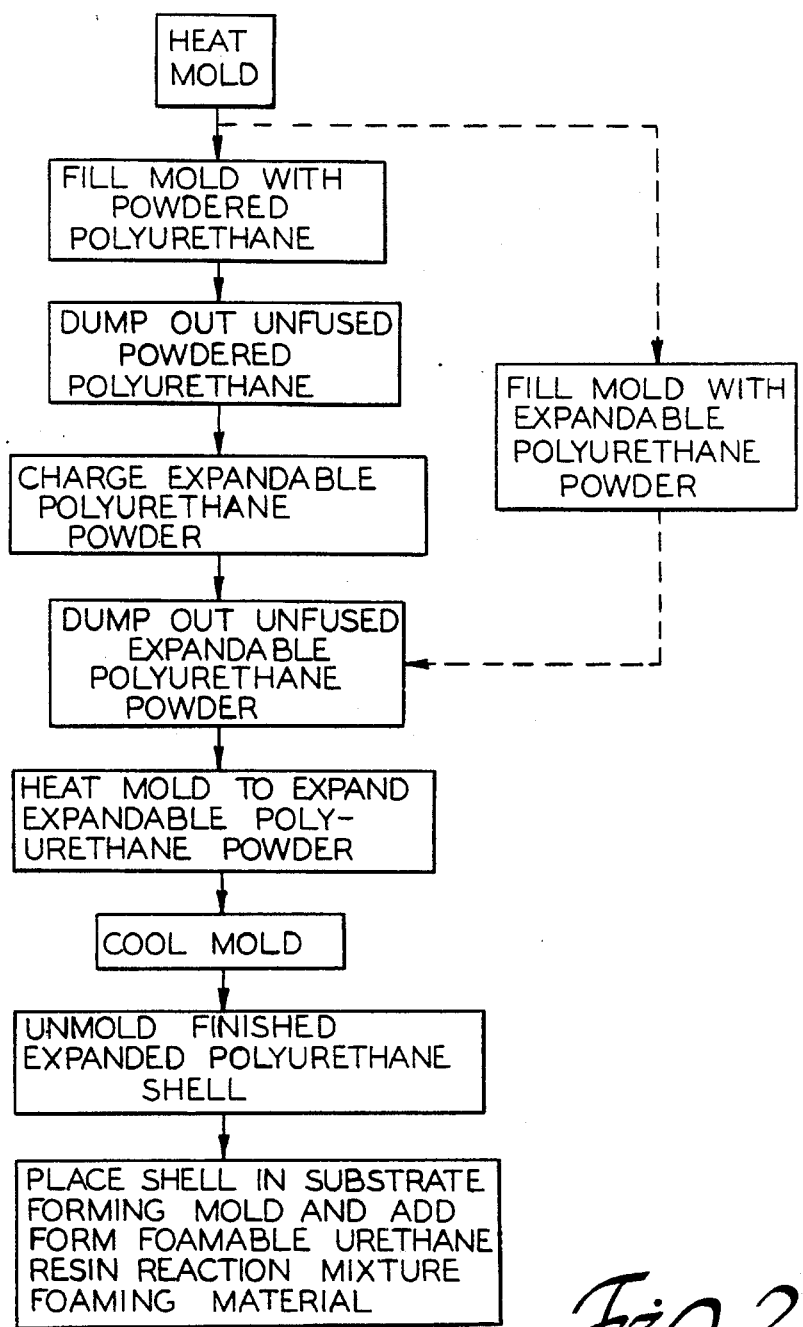
FIG. 2 is a flow chart showing the method of making the interior trim panel in accordance with the invention.

Referring now to the flow chart of FIG. 2, the all urethane interior trim panel 10 is efficiently and economically taking full advantage of slush molding and form in place processes.

First the flexible polyurethane skin layer 12 and the intermediate resilient polyurethane foam layer 14 are manufactured as an expanded thermoplastic urethane shell 18 in a slush process.

A double slush process and apparatus for practicing the process are generally described in U.S. Pat. No. 4,664,864 granted to John M. Wersosky May 12, 1987 which is hereby incorporated into this patent specification by reference.

Briefly stated and as it specifically relates to manufacture of an expanded thermoplastic urethane shell, the double slush process comprises the following steps.

First a shell forming mold is heated to about 400°–500° F. The heated mold is filled with a powder mixture such as the powder mixture composed of a light stable polyether/polyol prepared from reacting inter alia a polyol having low terminal end unsaturation and an organic diisocyanate that is more particularly described in U.S. patent application Ser. No. 08/319,614 by William Humphrey filed on Oct. 7, 1994.

After a short time, e.g. 1–10 seconds, the shell forming mold is turned upside down and the unfused powder is dumped out for recovery. This forms the skin layer 12 of flexible polyurethane that is about 0.1 to 1.0 mm in thickness on the shape giving surface of the shell mold cavity.

The shell forming mold is turned right side up and refilled with a foaming or expandable powder, composed of the powder mixture described above and 1 to 10 parts of a blowing agent such as Azodicarbonamide.

The shell forming mold is allowed to stand for about 5–30 seconds to fuse the expandable powder in contact with the skin layer 12. The shell forming mold is then turned upside down again dumping the unfused expandable powder for recovery.

The shell forming mold is then turned right side up and heated to about 400°–500° F. for about 30–90 seconds to expand the expandable powder fused to the skin 12. This forms the intermediate resilient polyurethane foam layer 14 of about 1.0 to 4.0 mm thickness that is fused to the skin layer 12 and completes the shaped shell 18.

The shell 18 is demolded when it has cooled enough and placed skin side down in a cavity of a substrate forming mold.

Alternatively the expanded thermoplastic urethane (TPU) shell could be made in a single slush molding process. With this alternative, the heated mold is initially filled with a polyurethane powder mixture that includes the blowing mixture and that forms the integral skin layer 12 and the resilient polyurethane foam layer 14 that is fused to it in a single casting operation.

In either event, a rigid polyurethane is then applied to the exposed surface of the resilient polyurethane foam layer 14 of the shell 18, suitable precursors being ICI 8709B polyol and ICI 8700A isocyanate. The substrate forming mold is then closed to cure the rigid polyurethane foam substrate 16 which completes the trim panel 10 shown in FIG. 1. Alternatively the rigid polyurethane foam may be applied by injecting a precursor mixture into the substrate forming mold after it is closed. The rigid polyurethane foam may be reinforced by milled fiber contained in the precursor mixture or a continuous mat preplaced in the substrate forming mold.

The invention uses a shell 18 of expanded thermoplastic urethane (TPU) for the skin 12 and the intermediate resilient foam layer 14 instead of an expanded polyvinylchloride which is commonly used today. As noted earlier an expanded polyvinyl chloride requires a coating of urethane for sufficient adhesion of any polyurethane foam layer that is subsequently formed in place. This urethane coating is expensive and difficult to apply. The method of this invention does not require any such coating because the bond strength between the resilient polyurethane foam layer 14 and the rigid polyurethane foam substrate 16 that is subsequently foamed in place is much stronger than is possible with an expanded polyvinyl chloride shell. This is due to the fact that the intermediate resilient polyurethane foam layer 14 and the rigid polyurethane foam substrate 16 of the invention are similar in chemical nature.

Moreover as indicated above the flexible polyurethane skin or facing layer 12 of the expanded polyurethane shell 18 retains its flexibility at low temperature and consequently the skin layer 12 does not crack or discolor in use resulting in an interior trim panel 10 of long life. The polyurethane skin layer 12 also retains its flexibility without any need for plasticizers so that the interior trim panel 10 is environmentally friendly. Furthermore, the flexible polyurethane skin does not include any chlorine or other ingredient that may be harmful to the environment in the event that it escapes or leaches out of the skin.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A method of manufacturing an interior trim panel having a flexible skin, a resilient intermediate foam layer and a rigid foam substrate comprising the steps of:

preparing a flexible fused skin layer from a polyurethane powder in a shell forming mold by heating the shell forming mold, filling the shell forming mold with the polyurethane powder and retaining the polyurethane powder in the heated mold until a skin layer of flexible polyurethane is formed that is about 0.1 to 1.0 mm in thickness, forming a resilient fused and expanded foam backing layer on the skin layer from a foamable polyurethane powder in the shell forming mold by filling the shell forming mold with the foamable polyurethane powder while the skin layer of flexible polyurethane is still in the shell forming mold and retaining the foamable polyurethane powder in the mold until a layer of resilient polyurethane foam that is about 1.0 to 4.0 mm in thickness is fused to the skin layer and formed to provide an expanded polyurethane shell, placing the expanded polyurethane shell in a forming mold, and forming a rigid polyurethane foam substrate in the forming mold that adheres to the foam backing layer of the expanded polyurethane shell strongly.

2. The method of manufacturing an interior trim panel having a flexible skin, a resilient intermediate foam layer and a rigid foam substrate as defined in claim 1 wherein the rigid polyurethane foam substrate is formed by injecting a polyurethane foam precursor mixture into the substrate forming mold.

3. The method of manufacturing an interior trim panel having a flexible skin, a resilient intermediate foam layer and a rigid foam substrate as defined in claim 2 wherein the shell is made of a thermoplastic polyurethane powder.

4. The method of manufacturing an interior trim panel having a flexible skin, a resilient intermediate foam layer and a rigid foam substrate as defined in claim 3 wherein the rigid polyurethane foam substrate is made of a thermosetting polyurethane.

5. The method of manufacturing interior trim panel having a flexible skin, a resilient intermediate foam layer and a rigid foam substrate as defined in claim 2 wherein the rigid polyurethane foam substrate is reinforced with milled fibers or a continuous mat.

6. The method of manufacturing an interior trim panel having a flexible skin, a resilient intermediate foam layer and a rigid foam substrate as defined in claim 2 wherein the rigid polyurethane foam substrate is made of a thermosetting polyurethane.

7. The method of manufacturing an interior trim panel having a flexible skin, a resilient intermediate foam layer and a rigid foam substrate as defined in claim 1 wherein the shell is made of a thermoplastic polyurethane powder.

8. The method of manufacturing an interior trim panel having a flexible skin, a resilient intermediate foam layer and a rigid foam substrate as defined in claim 1 wherein the rigid polyurethane foam substrate is made of a thermosetting polyurethane.

9. A method of manufacturing an interior trim panel having a flexible skin, a resilient intermediate foam layer and a rigid foam substrate comprising the steps of:

forming an expanded polyurethane shell in a double slush molding process by preparing a flexible fused skin layer from a polyurethane powder in a shell forming mold, heating the shell forming mold, filling the shell forming mold with the polyurethane powder and retaining the polyurethane powder in the heated mold until a skin layer of flexible polyurethane is formed, and then forming a resilient fused and expanded foam backing layer on the skin layer from a foamable polyurethane powder in the shell forming mold by filling the shell forming mold with the foamable polyurethane powder while the skin layer of flexible polyurethane is still in the shell forming mold and retaining the foamable polyurethane powder in the mold until a layer of resilient polyurethane foam is fused to the skin layer and formed to provide an expanded polyurethane shell, placing the expanded polyurethane shell in a forming mold, and forming a rigid polyurethane foam substrate in the forming mold that adheres to the foam backing layer of the expanded polyurethane shell strongly.

10. A method of manufacturing an interior trim panel having a flexible skin, a resilient intermediate foam layer and a rigid foam substrate comprising the steps of:

forming an expanded polyurethane shell comprising a flexible skin layer and a foamed resilient backing layer from a polyurethane powder in a shell forming mold in a single slush molding process by heating the shell forming mold, filling the shell forming mold with a mixture of the polyurethane powder and a blowing agent, retaining the mixture in the heated mold until a skin layer of flexible polyurethane is formed and a layer of resilient polyurethane foam is fused to the skin layer and formed, placing the expanded polyurethane shell in a forming mold, and forming a rigid polyurethane foam substrate in the foaming mold that adheres to the foam backing layer of the expanded polyurethane shell strongly.

11. A method of manufacturing an interior trim panel having a flexible skin, a resilient intermediate foam layer and a rigid foam substrate comprising the steps of:

preparing an expanded polyurethane shell comprising a flexible skin layer and a foamed resilient backing layer from a polyurethane powder in a shell forming mold by heating the shell forming mold, filling the shell forming mold with a mixture of the polyurethane powder and a blowing agent, retaining the mixture in the heated mold until a skin layer of flexible polyurethane is formed that is about 0.1 to 1.0 mm in thickness and a layer of resilient polyurethane foam is fused to the skin layer and formed to about 1.0 to 4.0 mm in thickness, placing the expanded polyurethane shell in a forming mold, and forming a rigid polyurethane foam substrate in the foaming mold that adheres to the foam backing layer of the expanded polyurethane shell strongly.

12. The method of manufacturing an interior trim panel having a flexible skin, a resilient intermediate foam layer and a rigid foam substrate as defined in claim 11 wherein the rigid polyurethane foam substrate is formed by injecting a polyurethane foam precursor mixture into the substrate forming mold.

13. The method of manufacturing an interior trim panel having a flexible skin, a resilient intermediate foam layer and a rigid foam substrate as defined in claim 12 wherein the shell is made of a thermoplastic polyurethane powder.

14. The method of manufacturing an interior trim panel having a flexible skin, a resilient intermediate foam layer and a rigid foam substrate as defined in claim 13 wherein the rigid polyurethane foam substrate is made of a thermosetting polyurethane.

15. The method of manufacturing an interior trim panel having a flexible skin, a resilient intermediate foam layer and a rigid foam substrate as defined in claim 12 wherein the rigid polyurethane foam substrate is made of a thermosetting polyurethane.

16. The method of manufacturing an interior trim panel having a flexible skin, a resilient intermediate foam layer and a rigid foam substrate as defined in claim 11 wherein the shell is made of a thermoplastic polyurethane powder.

17. The method of manufacturing an interior trim panel having a flexible skin, a resilient intermediate foam layer and a rigid foam substrate as defined in claim 11 wherein the rigid polyurethane foam substrate is made of a thermosetting polyurethane.

18. The method of manufacturing an interior trim panel having a flexible skin, a resilient intermediate foam layer and a rigid foam substrate as defined in claim 11 wherein the rigid polyurethane foam substrate is reinforced with milled fibers or a continuous mat.

* * * * *